April 10, 1962
T. O. STEARMAN ET AL
3,028,645
TIRE CHAIN CONNECTOR
Filed Jan. 27, 1959
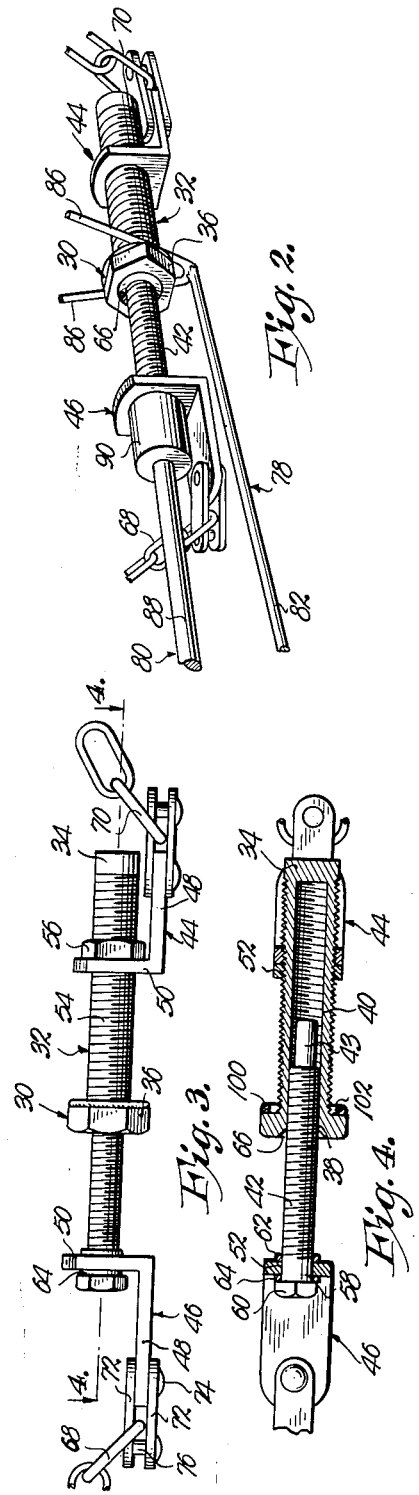
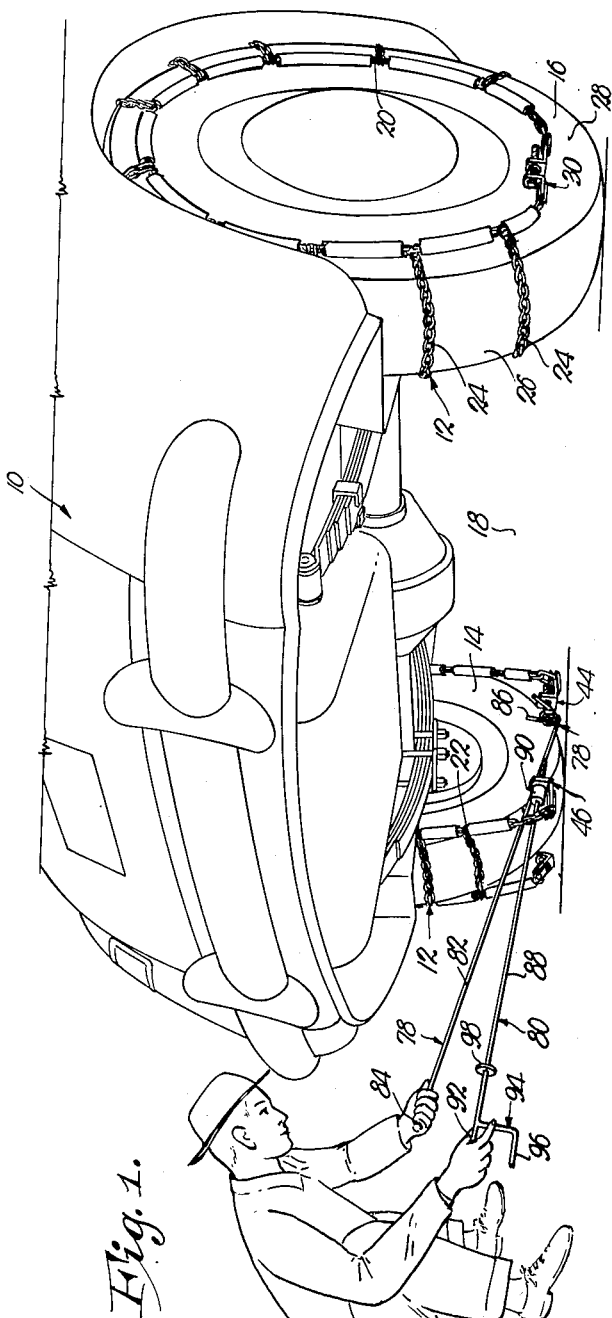
INVENTORS.
Thomas O. Stearman
Margie L. Stearman
BY
ATTORNEY.

United States Patent Office 3,028,645
Patented Apr. 10, 1962

3,028,645
TIRE CHAIN CONNECTOR
Thomas O. Stearman and Margie L. Stearman, both of 330 N. Wheeling, Kansas City, Mo.
Filed Jan. 27, 1959, Ser. No. 789,322
2 Claims. (Cl. 24—68)

This invention relates to traction devices adapted to be applied to the tires of a vehicle or the like in order to permit the vehicle to be operated over slick or muddy roads without the tires slipping on the road surface. More particularly, the invention comprises novel coupling units for interconnecting opposed ends of a tire chain adapted to be positioned on a vehicle tire in order to increase the traction of the same, regardless of the condition of the road surface, as well as to improved tool means permitting interconnection of the coupling units from a point remote from the underside of the vehicle.

Although many types of traction devices for vehicle wheels have previously been suggested and utilized, tire chains have proved to be the most effective under all types of road surface conditions. However, the use of tire chains has presented serious problems because of the difficulty of placing the chains on the vehicle tires, without the necessity of raising the tires off of the ground and then interconnecting opposed ends of the chains while the person is beneath the vehicle. It can be appreciated that this is a time consuming and laborious task necessitating contact with the relatively dirty undercarriage of the vehicle.

Since conventional tire chains which have proved to be the most effective utilize a pair of elongated lengths interconnected by cross chains, it can be recognized that opposed ends of the long lengths of the chain must be releasably connected by coupling units on opposed sides of the tires in order to assure relatively tight engagement of the chains with corresponding wheels.

It is therefore, the most important object of the present invention to provide novel units for interconnecting opposed ends of the long lengths of conventional tire chains by manually manipulable tools permitting releasable interconnection of the coupling units from a point remote from the underside of the vehicle and thereby precluding the necessity of the person crawling or otherwise reaching under the tire upon which the chain is being placed, or any portion of the underside of the vehicle.

A further important object of the invention is to provide a novel coupling unit as referred to above, having a pair of elongated elements each adapted to be secured to a respective end of one of the long lengths of the tire chain, with the elements themselves being constructed in a manner so that one of the same may be threadably telescoped into the other element whereby interconnection of opposed ends of the tire chain may be accomplished by the simple expedient of screwing one of the elements into the other and providing tight engagement of the tire chain with the vehicle wheel, regardless of the age of the chain.

An equally important object of the present invention is to provide a pair of elongated connecting elements adapted to be coupled together by improved manually manipulable tools permitting the elongated elements to be threadably intercoupled from a point away from the underside of the vehicle, with one of the tools serving to hold one element relatively stationary, while the other tool is employed to thread the other element into the first element referred to.

Also an important object of the invention is to provide a novel coupling unit for releasably interconnecting opposed ends of a tire chain wherein is provided novel means for securing each of the elements described above to a respective end of the chain, with one of the elements adjustably mounted on the means securing the same to the chain whereby suitable adjustment may be made in the length of the coupling unit to accommodate lengthening of the tire chain during extended use of the same.

Other important objects of the invention relate to the provision of a frusto-conical guide surface on the tubular element adapted to threadably receive the other element for facilitating guiding of the latter into the tubular element and thereby making it much easier to threadably interconnect the elements from a point remote therefrom by employment of the manually manipulable tools heretofore defined; to the provision of an operable assembly for interconnecting opposed ends of a tire chain adapted to be operated from a point remote therefrom obviating the necessity of reaching under the vehicle, which is simple in construction, has a long useful life and may be manufactured and distributed at a relatively low cost; and to other important objects and details of construction of the present assembly which will become obvious or be explained in greater detail as the following specification progresses.

In the drawing:

FIGURE 1 is a perspective, fragmentary view of the rear portion of a vehicle such as an automobile and illustrating the way in which the present manually manipulable tools may be utilized to releasably interconnect certain elements of the coupling unit forming a part of the invention and secured to opposed ends of a tire chain positioned over the vehicle wheel;

FIG. 2 is an enlarged, fragmentary, perspective view of one of the coupling units as well as the tools for releasably interconnecting opposed elements of the unit;

FIG. 3 is an enlarged, fragmentary, side elevational view of the coupling unit; and FIG. 4 is an enlarged, fragmentary, vertical, cross-sectional view taken substantially on the line 4—4 of FIG. 3 and looking downwardly in the direction of the arrows.

In order to permit safe operation of vehicle 10 over slick or otherwise hazardous road surfaces, it is oftentimes desirable and frequently necessary to place tire chains such as 12 over the rear wheels 14 and 16 thereof in order to provide traction between wheels 14 and 16 and the slick road bed 18.

It is contemplated that tire chains 12 be of conventional construction for the most part and thereby include a pair of elongated lengths 20 and 22 maintained in parallel relationship by a plurality of cross lengths 24 of sufficient length to extend across the outer, circumferentially extending face 26 of each of the tires 14 and 16 and permit opposed lengths 20 and 22 to engage the side walls 28 of tires 14 and 16 on opposed sides thereof. Lengths 20 and 22 normally are of sufficient length to extend around the entire circumference of the side walls 28 of tires 14 and 16, with cross lengths 24 also disposed in circumferentially spaced relationship around tires 14 and 16 to provide a maximum amount of traction during operation of vehicle 10.

Coupling units broadly designated 30 and constituting a part of the present invention, are adapted for interconnecting opposed ends of each of the lengths 20 and 22 and therefore, it can be seen that a pair of coupling units 30 are provided for each of the tire chains 12. Since each of the coupling units 30 are identical in construction, only one of the same will be described in detail and which is illustrated in FIGS. 2 to 4 inclusive. Each unit 30 includes an elongated, tubular element 32 which is closed at the end 34 thereof and provided with a polygonal enlargement 36 at the opposite end of the same, having an opening 38 in the central part thereof defining the inlet of the passage 40 extending substantially the entire length of element 32. It is to be understood that if desired, and to effect manufacturing economies, enlargement 36 may comprise a conventional nut welded to the outer surface of element 32 in concentric relationship with passage 40.

The pasage 40 of element 32 is threaded to complementally receive an elongated, externally threaded element 42 which is thereby telescoped into element 32 as element 42 is threaded into passage 40.

Means for joining elements 32 and 42 to respective ends of corresponding lengths 20 and 22, preferably comprises L-shaped members 44 and 46 for the elements 32 and 42 respectively. Each of the members 44 and 46 includes a pair of integral legs 48 and 50, with legs 50 being somewhat shorter than legs 48 and disposed in perpendicular relationship to the latter. Legs 50 have apertures 52 therein for rotatably receiving respective elements 32 and 42 with the surface of leg 50 of member 44 defining the aperture 52 therein being threaded to complementally engage the externally threaded surface 54 of element 32. It can therefore be seen that as element 32 is rotated on its longitudinal axis, the same shifts relative to leg 50 of member 44 depending upon the direction in which element 32 is rotated. Lock nut 56 threaded over element 32 is adapted to engage leg 50 of member 44 and thereby limit shifting movement of element 32 relative to member 44.

The end portion 58 of element 42 received within aperture 52 of member 46 is relatively smooth, as illustrated in FIG. 4, to permit free rotation of element 42 relative to member 46, while an enlargement 60 on the outer extremity of end portion 58 prevents reciprocable movement of element 42 relative to leg 50 of member 46 in one direction, and a washer 62 on element 42 at the opposite extremity of smooth portion 58 is disposed to engage the opposite face of leg 50 of member 46 and thereby preclude movement of element 42 in the opposite direction with respect to member 46. If desired, an additional washer 64 may be placed between enlargement 60 and leg 50 of member 46 to engage the proximal face of the defined leg 50.

It is to be noted that enlargement 60 is circumferentially polygonal in configuration, for reasons to be specified hereinafter. Also, the open end of element 32 presenting the entrance to passage 40 is provided with a frusto-conical guide surface 66 having its greatest width away from passage 40 to facilitate introduction of the end of element 42 remote from enlargement 60, into threaded passage 40 during interconnection of elements 32 and 42. This end 43 of element 42 is devoid of threads to insure the presence of a guide to cooperate with guide surface 66.

Structure for securing members 44 and 46 to the end links 68 and 70 of each of the lengths 20 and 22 of tire chains 12 comprises a pair of relatively flat links 72 secured to opposed faces of respective legs 48 through the provision of rivets 74 extending through links 72 and legs 48. Links 68 of lengths 20 and 22 are maintained between opposed links 72 by rivets 76 spanning the distance between links 72 at the ends thereof remote from rivets 74. It can therefore be seen that links 72 are pivotal about rivets 74 while links 68 may pivot between rivets 74 and 76 and relative to links 72.

The manually manipulable tools broadly numerated 78 and 80 for threading each of the elements 42 into respective elements 32 are illustrated in FIGS. 1 and 2 and particularly showing the way in which the same are used. Tool 78 has a relatively long shaft 82 with a handle 84 on one end thereof and a pair of radially extending, circumferentially spaced extensions 86 on the opposite end thereof defining a substantially V-shaped hook, with extensions 86 located in a plane substantially perpendicular to the longitudinal length of shaft 82.

Tool 80 also has an elongated shaft 88 with a socket 90 on one extremity thereof adapted to complementally receive polygonal enlargement 60 of element 42. Handle 92 on the end of shaft 88 opposed to socket 90 facilitates manipulation of tool 80, and a substantially L-shaped crank arm 94 is secured to shaft 88 adjacent handle 92 with the arm portion 96 thereof in parallel, spaced relationship to handle 92. Washer 98, secured or otherwise maintained in predetermined spaced relationship from crank 94 on shaft 88 facilitates rotation of tool 88 in a manner to be explained hereinafter.

A ring 100 may be secured to the rearmost annular face of enlargement 36 away from the inlet of passage 40 to thereby present a circular depression 102 between the inner margin or ring 100 and the outer threaded surface 54 of element 32. In this manner, a tool such as 78 may be employed having a simple J-shaped hook (not shown) on the end thereof away from handle 84, and in lieu of extensions 86, for holding element 32 in a stationary position during manipulation of tool 80.

It is to be perceived that coupling units 30 are preferably attached to tire chains 12 at the time of manufacture of the same, although it is manifest that units 30 may be subsequently attached to the chains if desired. In any event, members 44 and 46 are secured to links 68 and 70 of chains 12 through links 72 whereby elements 32 and 42 are positioned so that the same may be threadably interconnected by screwing of elements 42 into respective passages 40 of elements 32.

Tire chains 12 may be placed on wheels 14 and 16 without the necessity of lifting the wheels off the ground or of the person crawling or otherwise reaching under vehicle 10. Chains 12 are initially placed over the upper part of tires 14 and 16 so that elements 32 and 42 depend from respective lengths 20 and 22 as indicated in FIG. 1. Thereupon, the person grasps handle 84 of tool 78 and engages enlargement 36 of the element 32 disposed proximal to the inner side wall 28 of a tire such as 14. Shaft 82 of tool 78 is of sufficient length to permit the person to reach underneath vehicle 10 to hook enlarged portion 36 with extensions 86, without the necessity of reaching beneath the underside of vehicle 10. With enlargement 36 of the inwardly disposed element 32 held substantially stationary with tool 78, handle 92 of tool 80 is grasped and socket 90 is placed over enlargement 60 of the element 42 which is adapted to be threaded into the inwardly positioned element 32. Element 42 described above is pushed forwardly until the end thereof remote from enlargement 60 is received within passage 40, whereupon element 42 may be threaded into element 32 by the simple expedient of rotating tool 80. It is to be noted that guide surface 66 facilitates direction of element 42 into passage 40, notwithstanding the fact that the person is manipulating elements 32 and 42 from a position remote therefrom.

As soon as element 42 has been threaded into element 32 a short distance, the person drops tool 78 and grasps shaft 88 of tool 80 adjacent washer 98 with one hand and arm portion 96 of crank arm 94 with the other hand, whereby tool 80 may be rapidly rotated on the longitudinal axis thereof to quickly thread element 42 into element 32. Upon releasable connection of the elements 42 and 32 of unit 30, normally disposed on the inner side wall 28 of one of the tires 14 and 16, the person then moves to the outside of such tire and releasably connects elements 32 and 42 of the outer coupling unit. In this connection, it may be noted that the person may use his fingers to initially join elements 32 and 42 of the outer unit, whereupon tool 80 may be employed to rapidly intercouple the outer elements 32 and 42. In this way, chains 12 may be tightly placed over respective tires 14 and 16 by virtue of the mechanical advantage afforded by tool 80.

It is contemplated that lock nut 56 be disposed in predetermined relationship on each of the elements 32 with lock nut 56 normally being positioned adjacent end 34 of a respective element 32 when chains 12 are relatively new and then, as lengths 20 and 22 become longer by virtue of extended usage of tire chains 12, each of the lock nuts 56 may be moved toward respective enlargements 36 to compensate for the attenuation of lengths 20 and 22.

Having thus described the invention what is claimed as new and desired to be secured by Letters Patent is:

1. An assembly for releasably interconnecting opposed ends of a tire chain and manipulable by a pair of elongated, relatively shiftable tools from a location spaced from said chain, said assembly comprising a pair of members each having a pair of relatively angularly disposed legs thereon, one of the legs of each of said members adapted to be operably coupled with a corresponding end of the tire chain and the other leg of each of said members being provided with an aperture therethrough, the other leg of one of the members being threaded at the aperture thereof; a pair of elongated, member coupling elements disposed through respective apertures and movable relative thereto, one of said elements being tubular, externally and internally threaded and open at one extremity thereof, the other of said elements being externally threaded and having one end normally threadably received within said one extremity of said one element in telescoped relationship thereto said one element being threadably received within the aperture of said one member to shiftably mount said one element on said one member; a lock nut threadably mounted on said one element and engageable with the other leg of said one member for maintaining said one element in a fixed position relative to said one member; and tool engaging means on said elements, said means including an annular projection on and extending outwardly from said one extremity adapted to be engaged by one of said tools for urging said one element toward said other element and a head on the opposite end of said other element adapted to be engaged by the other tool for rotating said other element relative to said one element when said other tool is rotated relative to said one tool.

2. An assembly as set forth in claim 1, wherein said one element is provided wth a frusto-conical guide surface at said one extremity thereof and coaxial therewith for receiving said one end of said other element.

References Cited in the file of this patent
UNITED STATES PATENTS

| | | |
|---|---|---|
| 610,160 | Taylor | Aug. 30, 1898 |
| 797,715 | Boyd | Aug. 22, 1905 |
| 1,083,869 | Strongson | Jan. 6, 1914 |
| 1,707,754 | Bone | Apr. 12, 1929 |
| 1,826,988 | Campbell | Oct. 13, 1931 |
| 2,050,495 | Maynard | Aug. 11, 1936 |
| 2,259,926 | Delvo | Oct. 21, 1941 |
| 2,420,364 | Espenas | May 13, 1947 |
| 2,429,833 | Luce | Oct. 28, 1947 |
| 2,444,513 | Kostelny | July 6, 1948 |
| 2,806,392 | Auger | Sept. 17, 1957 |